United States Patent [19]
Hofsäss et al.

[11] Patent Number: 5,522,040
[45] Date of Patent: May 28, 1996

[54] ARRANGEMENT FOR TESTING A WATCHDOG CIRCUIT

[75] Inventors: Michael Hofsäss, Vaihingen/Enz; Werner Nitschke, Ditzingen; Harald Schweren, Korntal-Münchingen; Margit Angerbauer, Stuttgart, all of Germany

[73] Assignee: Robert Bosch GmbH, Stuttgart, Germany

[21] Appl. No.: 321,866

[22] Filed: Oct. 14, 1994

Related U.S. Application Data

[63] Continuation of Ser. No. 804,673, Dec. 10, 1991, abandoned.

[30] Foreign Application Priority Data

Dec. 10, 1990 [DE] Germany ............... 40 39 355.0

[51] Int. Cl.⁶ ............................................. G06F 11/00
[52] U.S. Cl. ............................ 395/185.08; 371/3; 371/62; 395/185.05; 364/267.9; 364/270; 364/264.5
[58] Field of Search .................. 371/3, 12, 16.3, 371/16.1, 25.1, 27, 9.1, 62, 66, 68.3; 395/575, 185.05, 185.08; 364/264, 264.5, 267.9, 270

[56] References Cited

U.S. PATENT DOCUMENTS

| | | | |
|---|---|---|---|
| 4,562,550 | 12/1985 | Beatty et al. | 364/492 |
| 4,574,355 | 3/1986 | Beatty et al. | 364/492 |
| 4,586,179 | 4/1986 | Sirazi et al. | 371/12 |
| 4,860,289 | 8/1989 | Coulson | 371/12 |
| 4,879,647 | 11/1989 | Yazawa | 371/62 |
| 4,956,842 | 9/1990 | Said | 371/62 |
| 5,014,190 | 5/1991 | Johnson | 364/200 |
| 5,041,827 | 8/1991 | Kirstein | 340/870.21 |
| 5,068,853 | 11/1991 | Soma et al. | 371/16.3 |
| 5,073,853 | 12/1991 | Johnson | 395/575 |
| 5,303,390 | 4/1994 | Little | 395/575 |
| 5,341,497 | 8/1994 | Younger | 371/16.3 |

FOREIGN PATENT DOCUMENTS

WO88/05570  7/1988  WIPO .

Primary Examiner—Robert W. Beausoliel, Jr.
Assistant Examiner—Dieu-Minh Le
Attorney, Agent, or Firm—Walter Ottesen

[57] ABSTRACT

The invention relates to an arrangement for testing a watchdog circuit wherein the pulses of a microcomputer to be monitored by the watchdog circuit are incrementally lengthened until the watchdog circuit responds and emits a corresponding reset signal to the microcomputer. The operational test of the watchdog circuit is repeated after each cold start of the microcomputer. This arrangement is especially suited for systems relevant to safety wherein the functional reliability of the individual components such as microcomputer and actuating elements are to be monitored.

9 Claims, 2 Drawing Sheets

ARRANGEMENT FOR TESTING A WATCHDOG CIRCUIT

This is a continuation of application Ser. No. 07/804,673, filed Dec. 10, 1991, now abandoned.

FIELD OF THE INVENTION

The invention relates to an arrangement of a microcomputer and a watchdog circuit having an input connected to a pulse output of the microcomputer and an output connected to the control input of the microcomputer.

BACKGROUND OF THE INVENTION

When utilizing a watchdog circuit for monitoring a pulse sequence of a microcomputer, the assumption is made that the microcomputer is "hung up" on a program step during the program sequence and the watchdog circuit emits a reset command to the microcomputer after a specific time has elapsed. This presupposes that the watchdog circuit always operates without malfunction. A watchdog circuit is disclosed in U.S. patent application Ser. No. 378,183, filed Jun. 26, 1989, now abandoned. The watchdog circuit of this application is disclosed in international patent publication WO 88/05570 and facilitates testing of actuating elements which are essentially computer controlled as well as the output of the microcomputer. However, a monitoring of the watchdog circuit itself does not take place.

A reliable monitoring of the watchdog circuit in combination with the microcomputer is especially required for systems which are relevant as to reliability and safety. Examples of such systems are ignition circuits or safety equipment in motor vehicles such as antilock systems or passive restraining systems such as an airbag or safety belts which must become operable at the instant of impact. However, since not only these systems but also the watchdog circuit itself can be subject to malfunction, it is required that their operational reliability be checked at specific time intervals and an alarm announcement be emitted in the case of a malfunction. A defect in the microcomputer or in the actuating element could no longer be detected when there is a breakdown of the monitoring arrangement, that is, of the watchdog circuit so that a malfunction can occur which is especially critical in a safety-relevant system.

SUMMARY OF THE INVENTION

In contrast to the above, the arrangement according to the invention affords the advantage that the trouble-free operation of the watchdog circuit can be tested for a test cycle with a pregiven pulse sequence. When pregiven limit values for the pulse sequence are exceeded or there is a drop therebelow, the watchdog circuit must supply a fault signal. If this signal does not appear, then this is an indication for a defective operation of the watchdog circuit.

It is especially advantageous that the pulse frequency can be changed in a step-like manner since the response limit for the watchdog circuit can be precisely determined.

A further advantage is seen in that the signal of the watchdog circuit triggers a reset of the microcomputer. This inhibits the program run of the microcomputer and the microcomputer is reset to the start position.

It is also advantageous that the pulse sequence for the test cycle of the watchdog circuit is emitted before the actual start of the work program since, in this way, a function breakdown of the watchdog circuit can be detected already after the microcomputer is switched on.

In order to make certain that the watchdog circuit is not retested while there is trouble-free operation, it is advantageous to write an appropriate code word into a memory after a reset command for the microcomputer which, on the one hand, documents the operational readiness of the watchdog circuit and, on the other hand, permits a test, which has already taken place, to be detected.

It is especially advantageous that the code word is stored in a nonvolatile semiconductor memory so that it is not lost when there is a drop in voltage.

A further advantage is seen in that the code word is changed after a completed test. In this way, and especially after the switch-on of the microcomputer, the possibility is provided to carry out the watchdog test when the code word is not available. On the other hand, the test does not take place when the code word is present.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
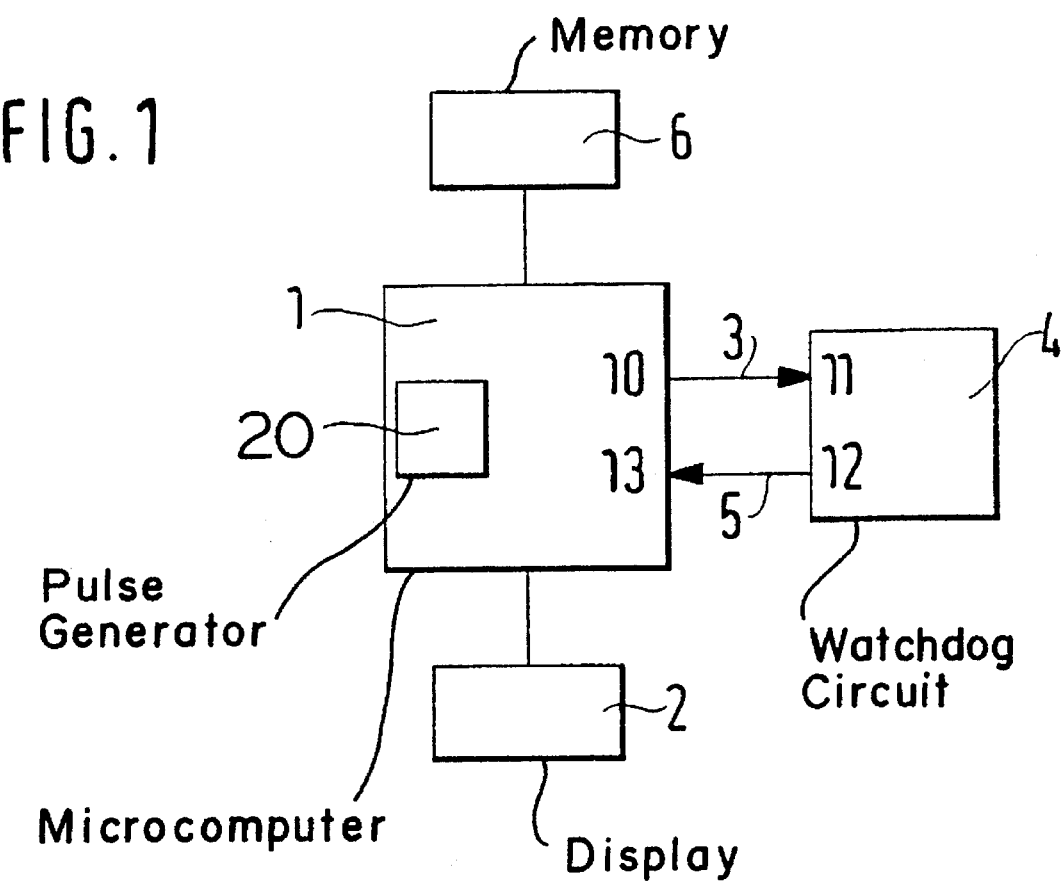
FIG. 1 is a block diagram of an embodiment of the arrangement according to the invention.
Figure 2:
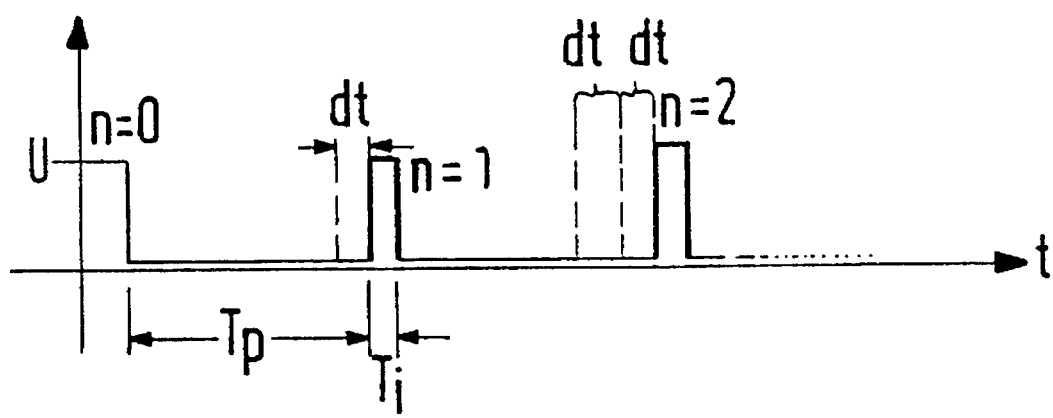
FIG. 2 is a pulse diagram.

In FIG. 1, a block diagram is shown with a microcomputer 1 which includes a pulse generator 20 in addition to the usual known components of a microcomputer such as input, main memory and central data processor. The pulse generator 20 corresponds to the known clock generator of a microcomputer which activates the microcomputer 1 with each clock pulse. The pulse generator 20 generates for example rectangular pulses having the amplitude U and the pulse width $T_i$ (FIG. 2). The dead time between two sequential pulses is $T_p$. A control program stored in the microcomputer enables the pulse generator 20 to increase the dead time $T_p$ by a time increment dt in a step-wise manner so that the nth pulse takes place after the time (n)(dt). This means that the dead time $T_p$ is increased from one pulse to the next pulse by a certain time (n)(dt). The pulse sequence is supplied by the output 10 of the microcomputer 1 via the line 3 to the input 11 of a watchdog circuit 4. The output 12 of the watchdog circuit 4 is connected via the line 5 to the input 13 of the microcomputer 1. The input 13 is configured as a reset input for the microcomputer 1. In addition, a display 2 is provided on the microcomputer 1 which can be configured as an LCD-display or an LED-display.

In FIG. 2, a pulse sequence is shown, wherein the pulses $T_i$ follow with incrementally increasing spacing. The amplitude U as well as the pulse width $T_i$ are constant. The drive of the pulse generator 20 takes place in an especially simple manner in that the smallest unit of time for the dead time $T_p$ corresponds to the time dt. In this way, the dead time $T_p$ can be increased uniformly by means of a simple program loop.

In a further embodiment of the invention, and in lieu of extending the dead time, the dead time $T_p$ is held constant and the pulse width $T_i$ is lengthened in the same manner as was described for the dead time. However, it is also provided that the pulse width or dead time is not lengthened but instead shortened in a step-like manner. In this case, a maximum pulse width or dead time must be assumed which is shortened in a step-like manner to a minimum. An incremental lengthening as well as an incremental shortening of the time interval makes the test of a so-called window watchdog arrangement possible; that is, a watchdog circuit which monitors lower as well as upper limits.

The operation of the circuit arrangement will now be described below.

The arrangement is used to test the operation of a watchdog circuit. For a cold start of the microcomputer 1, that is after applying operating voltage and loading the work program, the microcomputer 1 is first reset with a reset command and the pulse generator 20 started for emitting a pulse sequence shown in FIG. 2. The watchdog circuit 4 receives the transmitted pulse sequence on its input 11 and measures the dead time $T_p$. If the dead time $T_p$ is below a specific limit value, then the output 12 of the watchdog circuit 4 is not activated. If the dead time $T_p$ exceeds the pregiven limit value which is obtained after several pulses because of the dead time which continuously increases, then the output 12 is activated and sends a corresponding signal to the input 13 of the microcomputer 1. Since the input 13 acts as a reset input, the signal effects a reset of the microcomputer. Furthermore, a code word is read out of a memory cell of the memory 6 which provides information for exceeding the pregiven limit value. The code word in combination with the dead time $T_p$ exceeding the limit value signalizes the trouble-free operational response of the watchdog circuit so that the work program of the computer 1 is started. In the next step, the code word is however cancelled in the memory cell of the memory 6 and a neutral information is written in. This affords the advantage that for a renewed cold start of the computer 1, first the test function for the watchdog circuit 4 must be started.

A further especially simple embodiment for the operation test of the watchdog circuit 4 is seen in that in lieu of the pulse sequence, only a 0-pulse or a 1-pulse is transmitted. These pulses are so long that the watchdog circuit 4 does not respond to the 0-pulse; whereas, the watchdog circuit 4 does always respond to a 1-pulse. This ensures that the watchdog circuit operates correctly. The evaluation of the watchdog signal takes place in the same manner as described earlier.

Figure 3:
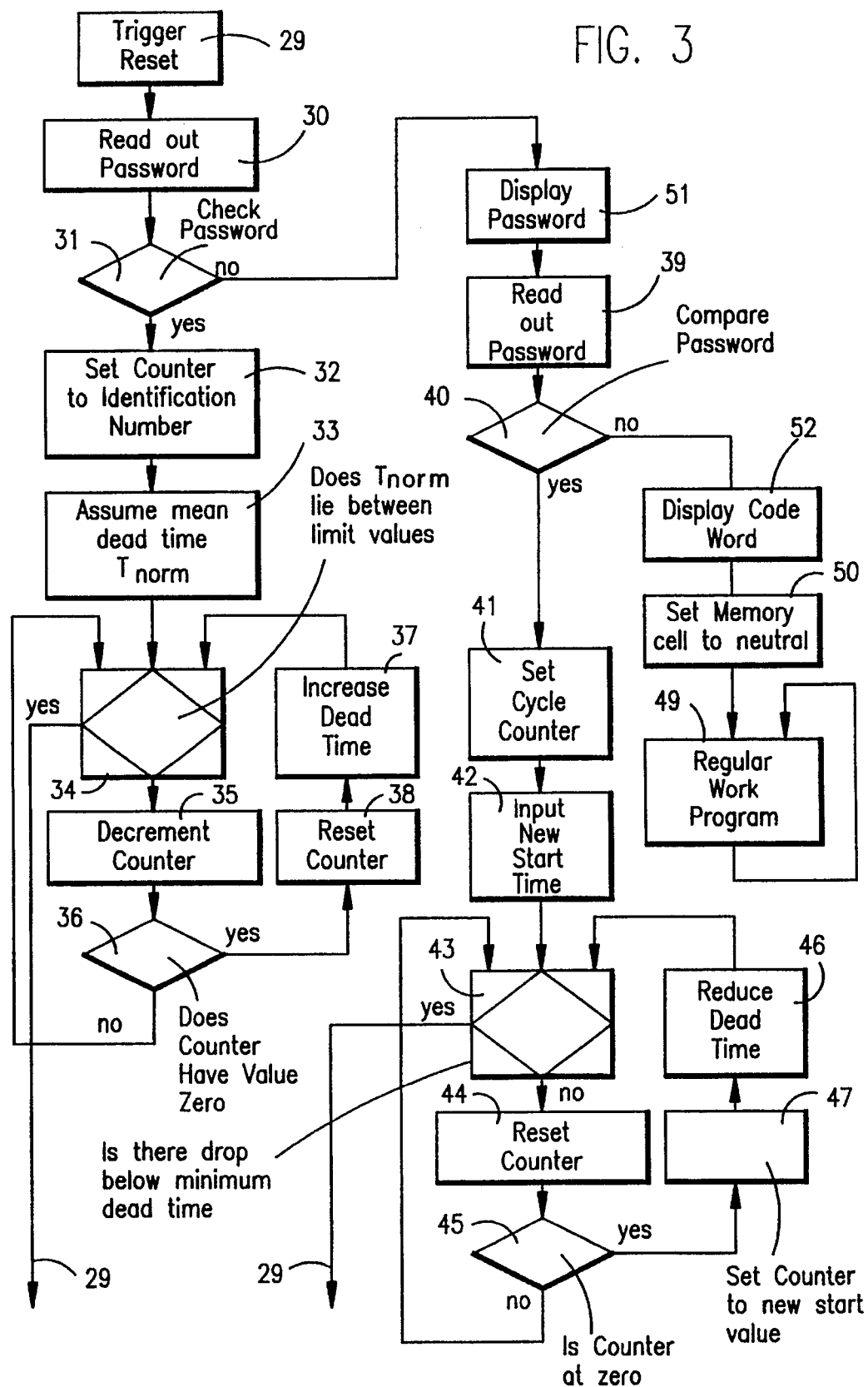
FIG. 3 is a flowchart.

The flowchart of FIG. 3 shows a further embodiment of the invention in which the operation of a watchdog circuit can be tested with a window comparator. For testing the window, the period of a pulse sequence is tested as to minimum and maximum limit values. For clarity, the assumption is made that the pulse width $T_i$ is constant and the dead time $T_p$ is increased or shortened in a step-like manner.

According to FIG. 3, a reset is triggered (position 29) after the microcomputer is switched on and the program is loaded. At position 30, the password 1 is read out of the memory 6 and checked in position 31. If the password is "neutral", then a counter is set in position 32 to any desired identification number, for example 5. The counter signals how long the pulse sequence for testing the watchdog circuit is to be, that is, how many periods with the same period length should be run through. In an especially advantageous manner, this function provides on the one hand that a test redundancy takes place which is free of disturbance signals or defective measurements. On the other hand, repeating the individual pulses ensures that the switching times of the hardware components caused by physical conditions do not disadvantageously affect the measuring result.

In one example, the assumption is made that the minimum limit for the dead time $T_{min}$ is equal to 3 milliseconds and the limit for the maximum dead time $T_{max}$ is equal to 8 milliseconds. The window watchdog should supply a reset signal to the microcomputer 1 via the data line 5 each time when there is drop below the minimum limit or when the maximum limit is exceeded. In order to start a test run, a mean dead time $T_{norm}$=6 ms is assumed in position 33. This value is stored as a code word in the memory 6. In position 34, a check is made by the watchdog monitoring as to whether the time $T_{norm}$ lies between the limit values of 3 and 8 ms. If this condition is satisfied, the counter is decremented, that is, reduced to 4 (position 35). In position 36, a check is made as to whether the counter has the value zero. Since the 4 is still present in the counter register, a new pulse is transmitted with the same pulse width $T_{norm}$=6 ms and the inquiry begins again at position 34. After five cycles or, more specifically, after a total of five pulses and five dead times $T_p$ have been transmitted, then the counter has the value zero in position 36. In the next step, at position 38, the counter is again reset to a start value which can for example again be the 5. In position 37, the dead time is increased by a unit of time (dt) so that the dead time is 7 ms and the new value for the dead time is stored as code word 1 in the memory 6. Thereafter, an inquiry is made in position 34 as to whether there is a drop below the pregiven limits or whether these limits have been exceeded. The repeated runs through the loop 34-35-36-34 occur until the counter has the value zero. Thereafter, a jump is made again into the loop 38-37 and the dead time is again increased by a unit to 8 ms. Thereafter, an inquiry takes place again via repeated runs through the loop 34-35-36-34. With the next run-through, when the dead time was increased to 9 ms, it is detected in position 34 that the limit has been exceeded and there is a jump back to position 29.

A reset of the microcomputer is triggered in position 29. If the watchdog circuit were not in order, then the reset command would not be triggered and the microcomputer would be switched off after a certain time or an error signal would be emitted.

After jumping back to position 29, the password 1 which had previously been written in is read out in position 30 and it is therefore detected in position 31 that the password is not "neutral". In this case, the password 1 is shown on the display 51 whereby the value for the maximum dead time can be read off. Thereafter, in the second column in position 39, the password 2 is read out and checked in position 40. The password 2 corresponds to the lower limit value $T_{min}$. The further check sequence takes place in an analog manner as described above. In position 41, the cycle counter is again set to a desired value such as 5 and, in position 42, a new start time $T_{norm}$ such as 5 ms is inputted and stored in the memory 6 as code word 2. The inputs for the start times are already determined when the watchdog monitoring is set up.

In position 43, the inquiry takes place by means of the watchdog monitor as to a drop below the minimum dead time $T_{min}$. In position 44, the counter is again reset by one position and in position 45, an inquiry of the counter as to the value zero is made. A renewed pulse output or dead time output having the same length takes place and a jump back to position 43. The loop 43-44-45 is repeated until the counter is set to zero. Thereafter, a jump to position 47 takes place wherein the counter is set to a new start value. In position 46, the dead time is reduced by one unit of time and code word 2 is stored in the memory 6 and in position 43, an inquiry as to the limit value is again made. Thereafter, loop 43-44-45-43 is repeatedly run through until the counter has the value zero.

The computer can now read out both code words 1 and 2 after the start thereof. The computer detects that both code words (1, 2) are not "neutral". After displaying the code word 2 on the display 52, the two memory cells (position 50) are again set to "neutral" in order to initialize the test. The computer then bipasses positions 31, 39 and 40 into the start position of its regular work program (position 49) and can then work through this program. The displays 51 and 52 could also be configured as a single display.

For the case of a volatile memory or when the nonvolatile memory is erased within the work program from outside (for example via a diagnosis), step 50 can be omitted when it is desired that the code words are cancelled only when switching off the watchdog circuit or the microcomputer or the voltage supply of the memory so that the next cold start of the microcomputer can take place with a renewed watchdog test. Then, the microcomputer reads the non-neutral code words 1 and 2 out in the warm start case and immediately begins with the work program.

It is understood that the foregoing description is that of the preferred embodiments of the invention and that various changes and modifications may be made thereto without departing from the spirit and scope of the invention as defined in the appended claims.

What is claimed is:

1. An arrangement for testing operation of a watchdog circuit, the arrangement comprising:

said watchdog circuit having an input and an output;

a microcomputer having a pulse output connected to the input of said watchdog circuit and a control input connected to said output of said watchdog circuit;

said microcomputer having a pulse generator for supplying a pulse sequence to said watchdog circuit during a test cycle for testing the operation of said watchdog circuit;

said pulse sequence having a pulse width $T_i$, pulse dead time $T_p$ and pulse amplitude wherein said pulse width $T_i$, said pulse dead time $T_p$ and said pulse amplitude are respective parameters of said pulse sequence and one of said parameters being variable;

said watchdog circuit including comparator means for comparing said one variable parameter of said pulse sequence to a pregiven limit value and for generating and supplying a reset signal to said microcomputer when said one parameter departs from said limit value by exceeding said limit value or by dropping below said limit value;

said microcomputer including means for changing said one parameter of said pulse sequence when said pulse sequence is supplied to said watchdog circuit;

said means for changing said one parameter being adapted to change said one parameter of said pulse sequence to a value which lies above or below said limit value; and, said microcomputer further including means for determining that the operation of said watchdog circuit is correct when said reset signal is received from said watchdog circuit during said test cycle.

2. The arrangement of claim 1, wherein said one parameter is variable which changes in predetermined increments.

3. The arrangement of claim 1, wherein said signal supplied to said microcomputer triggers a reset of said microcomputer.

4. The arrangement of claim 1, wherein said microcomputer is provided with software defining a work program and said pulse sequence is emitted in advance of a start of said work program.

5. The arrangement of claim 1, wherein said microcomputer has a memory in which a code word representing a disturbance-free operation of said watching circuit can be stored; and, said microcomputer being adapted to start supplying said pulse sequence to said watchdog circuit when the code word is not in said memory.

6. The arrangement of claim 5, wherein said code word is entered into said memory when an operation of said watchdog circuit is free of disturbance.

7. The arrangement of claim 1, wherein said one parameter which is changed is said pulse width $T_i$.

8. The arrangement of claim 1, wherein said one parameter which is changed is said pulse dead time $T_p$.

9. The arrangement of claim 1, wherein said one parameter which is changed is said pulse amplitude.

* * * * *